Aug. 27, 1957　　　　R. A. SUTER　　　　2,803,855
DISAPPEARING BED FOR HOUSE TRAILERS
Filed Dec. 6, 1955　　　　　　　　　　　　2 Sheets-Sheet 1
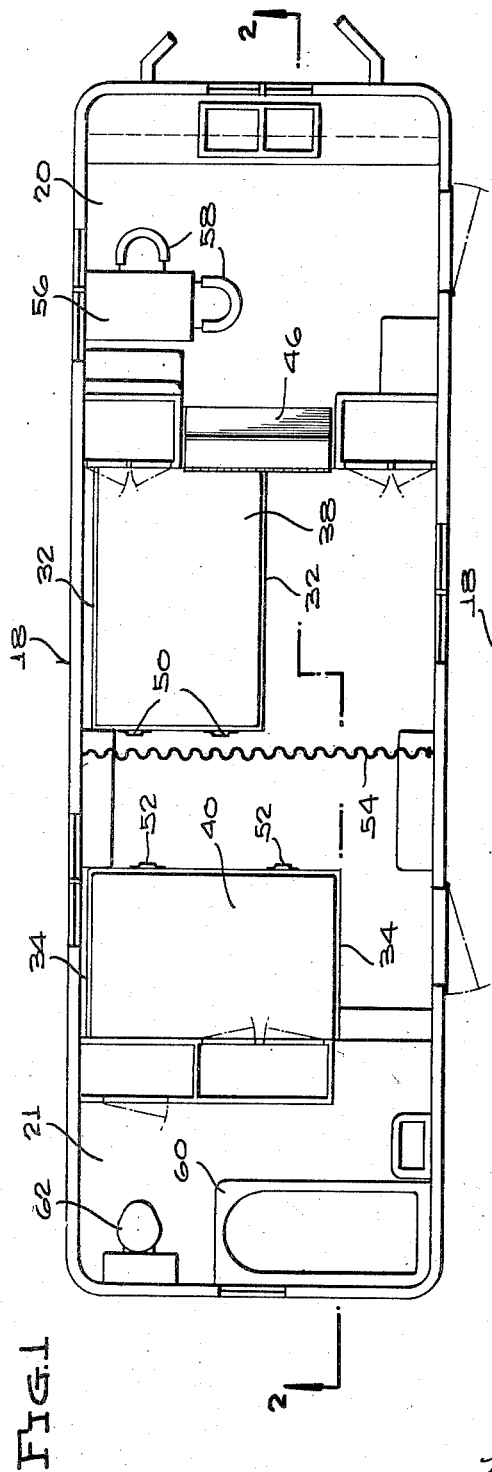
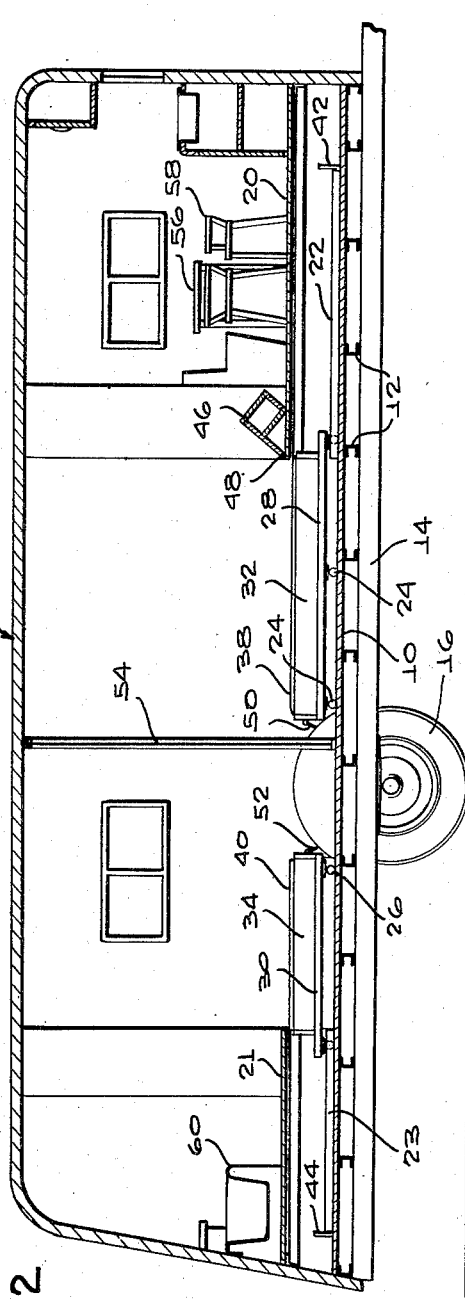
INVENTOR.
ROBERT A. SUTER
BY
McMorrow, Berman & Davidson
ATTORNEYS Aug. 27, 1957 R. A. SUTER 2,803,855
DISAPPEARING BED FOR HOUSE TRAILERS
Filed Dec. 6, 1955 2 Sheets-Sheet 2
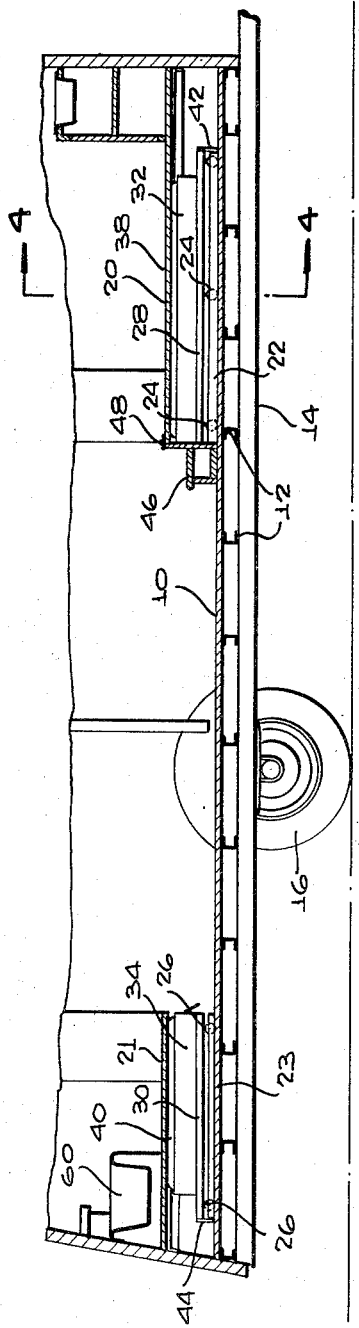
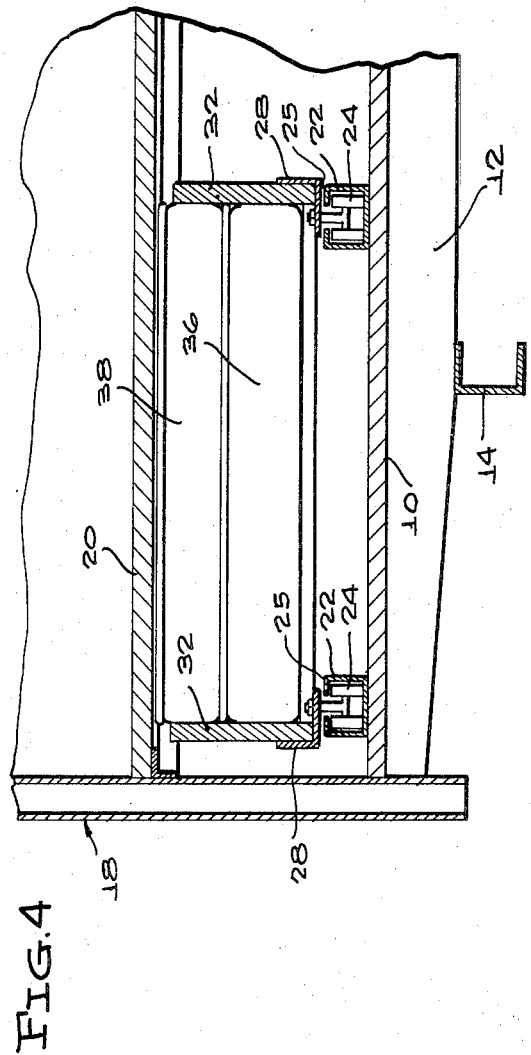
INVENTOR.
ROBERT A. SUTER
BY
McMorrow, Berman & Davidson
ATTORNEYS

United States Patent Office 2,803,855
Patented Aug. 27, 1957

2,803,855

DISAPPEARING BED FOR HOUSE TRAILERS

Robert A. Suter, Miami, Fla.

Application December 6, 1955, Serial No. 551,401

3 Claims. (Cl. 20—1.11)

This invention relates to improvements in house trailers having disappearing bed structure.

The main object of the present invention is to provide an improved house trailer having platforms defining floor areas raised above the main floor of the trailer, and improved sliding beds arranged to be rolled out onto the main floor space from concealed and out-of-the-way positions beneath the raised floor areas.

Another object of the invention is to provide improved means for slidably mounting the beds under the raised floor areas which prevents lateral displacement of the beds when positioned beneath the raised floor areas and which permits the beds to be easily moved to their use positions.

Another object is to provide, in a house trailer as stated, swinging step means facilitating passage between the raised floor areas and the main floor area, which serves as closure means for the bed-receiving chambers defined by the raised floor areas.

Other objects will appear from the following description, and from the annexed drawing, in which like reference characters designate like parts throughout the several views, and wherein:

Figure 1 is a plan of the interior of a house trailer formed according to the present invention;

Figure 2 is a vertical longitudinal sectional view on line 2—2 of Figure 1 showing the beds withdrawn for use;

Figure 3 is a fragmentary view similar to Figure 2, showing the beds concealed beneath the raised floor areas; and Figure 4 is an enlarged fragmentary transverse vertical sectional view on line 4—4 of Figure 3.

The illustrated house trailer comprises a main floor 10 supported on chassis cross members 12, which in turn are supported upon longitudinal chassis members 14 constituting a chassis having ground wheels 16. The body or shell 18 of the trailer can be of any desired shape, width, and length. At opposite ends of the trailer there are provided raised, horizontal platforms or raised floor areas 20, 21 which are spaced above the main floor 10 and define bed receiving chambers which have open ends which are spaced from each other longitudinally of the trailer. Secured upon the main floor 10, within each chamber, is a pair of laterally spaced longitudinal channels, the channels beneath the front platform 20 being designated 22 and those below the rear platform 21 being designated 23. As shown in Figure 4, the channels open upwardly and have spaced inwardly turned flanges 25 along the top edges of their side walls. Rolling on the bottoms of the channels and confined between their side walls and the inturned flanges 25 are longitudinally spaced pairs of wheels 24 and 26, respectively, extending downwardly from the bed side rails 28, 30 of the respective disappearing beds 31 and 33. The bed side rails are of angle iron or the like. Mounted fixedly on the side rails 28 and 30 are upstanding side walls 32, 32 and 34, 34, respectively.

Supported between the side walls 32 upon the side rails 28 is a box spring 36. The bed at the other end of the trailer is provided with a similar box spring, and supported upon the respective box springs are mattresses 38, 40 respectively.

On the inner ends of the channels 22 and 23 are upstanding stops 42, 44, respectively, which limit movement of the beds into the chambers. For closing the open ends of the chambers after the related bed has been moved thereinto, there is provided a swinging step 46 hinged at 48 to the related end of the platform 20. The other disappearing bed assembly can be provided with a similar step, and either or both steps can be extended over the full widths of the open ends of the chamber, according to the particular design of the trailer. In the illustrated example, step 46 extends only partially across the width of the associated chamber, and the remainder of the open end of the chamber can be closed by swinging doors or the like.

It may be noted, in this regard, that the recesses can be of a width substantially greater than the corresponding dimensions of the associated beds, and this would permit the portion of the recess that does not receive the bed to be used for storage. All this would be dependent, of course, on the size of the particular trailer, and on the wishes of the particular manufacturer.

On the outer ends of the beds, that is, those ends which move out of the recess first when the beds are being drawn to extended positions, there are provided handles 50, 50, and 52, 52 of the respective beds.

It will be seen that the arrangement provides what is in effect a sunken living space which can be converted into a pair of bedrooms. When the beds are pulled out of the recesses for use, as shown in Figures 1 and 2, a bamboo drape or other collapsible or foldable partitioning means 54 is drawn across the trailer, to provide, in effect, separate bedrooms.

The trailer can be furnished as desired, of course, and as one example of the interior furnishings and designs there is provided a lavatory including a bath tub 60, water closet 62, and other bathroom equipment including linen closets, etc. The remainder of the trailer can be furnished as desired, of course. For example, a table 56, chairs 58 and other kitchen and dining equipment shown in Figs. 1 and 2 may be placed on the raised floor area 20.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a house trailer, a shell having a main floor, a platform spaced above said main floor and having a free edge, said platform otherwise being enclosed by said shell and defining with said main floor a bed receiving chamber open at said free edge, a pair of laterally spaced channels fixed on said main floor beneath said platform, said channels having bottoms, side walls, and spaced inturned flanges on the upper edges of said side walls, the ends of the channels at the free edge of the platform being open, a bed frame comprising longitudinal side rails, longitudinally spaced pairs of roller means comprising brackets depending from said side rails into the channels between said inturned flanges, rollers on said brackets rolling on the channel bottoms and confined by said side walls, and said inturned flanges, when the bed is in said chamber, some of said rollers being arranged to roll upon the main floor when the bed is withdrawn from the chamber and rollers leave the open ends of the channels.

2. In a house trailer, a shell having a main floor, a platform spaced above said main floor and having a free edge, said platform otherwise being enclosed by said shell and defining with said main floor a bed receiving chamber open at said free edge, a pair of laterally spaced channels fixed on said main floor beneath said platform, said channels having bottoms, side walls, and spaced inturned flanges on the upper edges of said side walls, the ends of the channels at the free edge of the platform being open, a bed frame comprising longitudinal side rails, longitudinally spaced pairs of roller means comprising brackets depending from said side rails into the channels between said inturned flanges, rollers on said brackets rolling on the channel bottoms and confined by said side walls, and said inturned flanges, when the bed is in said chamber, some of said rollers being arranged to roll upon the main floor when the bed is withdrawn from the chamber and rollers leave the open ends of the channels, and upstanding stops for the bed frame rails at the other ends of the channels.

3. In a house trailer, a shell having a main floor, a platform spaced above said main floor and having a free edge, said platform otherwise being enclosed by said shell and defining with said main floor a bed receiving chamber open at said free edge, a pair of laterally spaced channels fixed on said main floor beneath said platform, said channels having bottoms, side walls, and spaced inturned flanges on the upper edges of said side walls, the ends of the channels at the free edge of the platform being open, a bed frame comprising longitudinal side rails, longitudinally spaced pairs of roller means comprising brackets depending from said side rails into the channels between said inturned flanges, rollers on said brackets rolling on the channel bottoms and confined by said side walls, and said inturned flanges, when the bed is in said chamber, some of said rollers being arranged to roll upon the main floor when the bed is withdrawn from the chamber and rollers leave the open ends of the channels, and closure means for the open end of the chamber comprising a steps assembly hinged in the free edge of the platform to swing from an inoperative position above the platform to a closure position across the open end of the chamber when the bed is in the chamber.

References Cited in the file of this patent

UNITED STATES PATENTS

| | | |
|---|---|---|
| 839,996 | Holmes | Jan. 1, 1907 |
| 944,021 | Edmonds | Dec. 21, 1909 |
| 2,038,001 | Redding | Apr. 21, 1936 |
| 2,049,088 | Singer | July 28, 1936 |
| 2,701,393 | Madsen et al. | Feb. 8, 1955 |